United States Patent
Paster

(10) Patent No.: US 8,122,129 B2
(45) Date of Patent: Feb. 21, 2012

(54) HASH-BASED RESOURCE MATCHING

(75) Inventor: Steven B. Paster, San Carlos, CA (US)

(73) Assignee: Actiance, Inc., Belmont, CA (US)

( * ) Notice: Subject to any disclaimer, the term of this patent is extended or adjusted under 35 U.S.C. 154(b) by 295 days.

(21) Appl. No.: 12/206,930

(22) Filed: Sep. 9, 2008

(65) Prior Publication Data

US 2010/0064042 A1    Mar. 11, 2010

(51) Int. Cl.
*G06F 15/173* (2006.01)

(52) U.S. Cl. ........ 709/225; 709/224; 709/223; 709/231; 709/206; 370/401

(58) Field of Classification Search .............. 709/225
See application file for complete search history.

(56) References Cited

U.S. PATENT DOCUMENTS

| | | | |
|---|---|---|---|
| 2005/0010765 A1* | 1/2005 | Swander et al. | 713/166 |
| 2005/0193429 A1* | 9/2005 | Demopoulos et al. | 726/23 |
| 2007/0071015 A1* | 3/2007 | Wang et al. | 370/401 |
| 2007/0220064 A1* | 9/2007 | Najork | 707/202 |
| 2007/0299777 A1* | 12/2007 | Shraim et al. | 705/51 |
| 2008/0034073 A1* | 2/2008 | McCloy et al. | 709/223 |
| 2008/0082662 A1* | 4/2008 | Dandliker et al. | 709/225 |
| 2008/0098463 A1* | 4/2008 | Wikman | 726/5 |
| 2008/0163380 A1* | 7/2008 | Liu | 726/28 |
| 2008/0196085 A1* | 8/2008 | Nagoya et al. | 726/3 |
| 2009/0064330 A1* | 3/2009 | Shraim et al. | 726/22 |
| 2009/0070872 A1* | 3/2009 | Cowings et al. | 726/23 |
| 2009/0077648 A1* | 3/2009 | Swander et al. | 726/13 |

OTHER PUBLICATIONS

Using Signatures to Improve URL routing (Z. Genova and K.J. Christensen) 2002 IEEE.*

* cited by examiner

*Primary Examiner* — Tammy Nguyen
*Assistant Examiner* — Natisha Cox
(74) *Attorney, Agent, or Firm* — Kilpatrick Townsend & Stockton LLP

(57) ABSTRACT

In various embodiments, techniques can be provided for identifying and filtering network resources. The filtering may occur not only on the type of network traffic (e.g., HTTP traffic) but also with resources identified by the network traffic. In some embodiments, one or more hash functions may be used to facilitate the identification, searching, and matching of network resources. The network resources may be identified as a unique domain, unique network host, unique URL, or the like.

21 Claims, 17 Drawing Sheets

| INDEX | HOSTNAME HASH | HOSTNAME CRC | LENGTH | URL HASH | URL CRC | ID | PR_ID | FLAGS |
|---|---|---|---|---|---|---|---|---|
| ... | ... | ... | ... | ... | ... | ... | ... | ... |
| 2335 | 2350219 | 0X1FEF | 28 | 1393743 | 0X248 | 24 | 43 | BLOCK |
| 2336 | 2350220 | 0X171E | 23 | 2350220 | 0X171 | 35 | 23 | BLOCK |
| 2337 | 2350257 | 0X17D5 | 20 | 2350257 | 0X248 | | | CONT |
| 2338 | 2350257 | 0X17D5 | 27 | 1043743 | 0X248 | 54 | 73 | BLOCK |
| 2339 | 2350257 | 0X17D5 | 48 | 690031 | 0X248 | 19 | 73 | BLOCK |
| 2340 | 2460424 | 0X17EF | 127 | 1393743 | 0X248 | 5 | 3 | BLOCK |
| ... | ... | ... | ... | ... | ... | ... | ... | ... |

FIG. 7

HASH-BASED RESOURCE MATCHING

BACKGROUND OF THE INVENTION

This application relates to the field of computer networks, and specifically to software and hardware for identifying network resources.

With the advent of modern computers and computer networks, users have been provided with a faster electronic means of communicating with each other. Browser applications, such as Internet Explorer from Microsoft Corporation and Firefox from the Mozilla Foundation, can allow users to browse the world-wide web, obtain news information, share photos or music, or the like, through computer networks, such as the Internet. In another example, e-mail and instant messaging can allow users to interact, for example, in real-time communications.

Computer networks can often include hundreds or thousands of network hosts. A network host can be a computer or other hardware device that runs software applications and originates and/or receives network flows. Network administrators may often be responsible for maintaining these network hosts in proper running order. The network administrators may incorporate a variety of methodologies and devices in an attempt to ensure the network operates securely and reliably. To that end, network administrators may often set rules or network policies for users, groups, and devices about the types of software applications and network traffic allowed on a network.

Network applications may include software applications on a network host that are responsible for originating and/or receiving network traffic flows, referred to as network flows. Some network applications may be well-behaved and conform with a network's rules and policies. Other network applications may be poorly-behaved, installing without a user's or network administrator's permission, hiding themselves and their operation, and violating a network's rules and policies. Examples of poorly-behaved network applications may include computer viruses, worms, spyware, and malware applications. Additionally, some more legitimate applications, such as instant messaging applications, file-sharing or other types of peer-to-peer network applications, voice-over IP (VOIP) communication applications, and multimedia applications may be responsible for network flows that can circumvent network policies and jeopardize network security and reliability.

Accordingly, what is desired are improved methods and apparatus for solving some of the problems related to filtering network traffic. Additionally, what is desired are improved methods and apparatus for reducing some of the drawbacks related to filtering network traffic.

BRIEF SUMMARY OF THE INVENTION

In various embodiments, techniques can be provided for identifying and filtering network resources. The filtering may occur not only on the type of network traffic (e.g., HTTP traffic) but also with resources identified by the network traffic. In some embodiments, one or more hash functions may be used to facilitate the identification, searching, and matching of network resources. The network resources may be identified as a unique domain, unique network host, unique URL, or the like.

A further understanding of the nature, advantages, and improvements offered by those inventions disclosed herein may be realized by reference to remaining portions of this disclosure and any accompanying drawings.

BRIEF DESCRIPTION OF THE DRAWINGS

In order to better describe and illustrate embodiments and/or examples of any inventions presented within this disclosure, reference may be made to one or more accompanying drawings. The additional details or examples used to describe the accompanying drawings should not be considered as limitations to the scope of any of the disclosed inventions, any of the presently described embodiments and/or examples, or the presently understood best mode of any invention presented within this disclosure.

FIGS. 5, 6, and 7 are diagrams of hash tables that may be used for filtering network traffic in one embodiment according to the present invention;

DETAILED DESCRIPTION OF THE INVENTION

Figure 1:
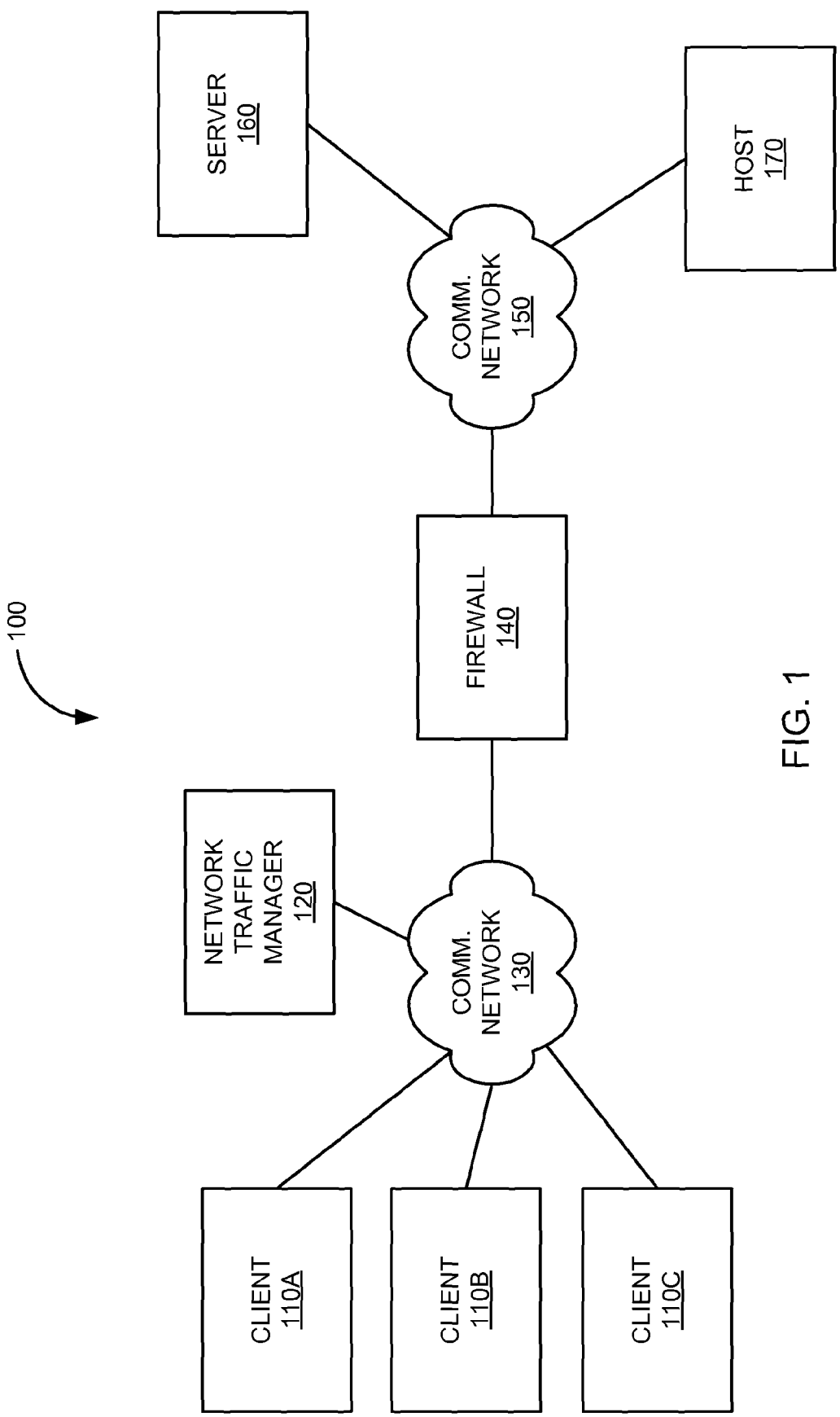
FIG. 1 is a block diagram of a system for identifying users who initiate network traffic in one embodiment according to the present invention.

FIG. 1 is a block diagram of system 100 for filtering network traffic in one embodiment according to the present invention. In this example, system 100 can include a plurality of clients 110 (e.g., client 110A, client 110B, and client 110C), network traffic manager 120, communications network 130, firewall 140, communications network 150, server 160, and host 170.

Clients 110 can include any computing device, such as a personal computer (PC), laptops, workstations, mainframes, pocket PC, personal digital assistant (PDA), RIM blackberry device, telephone, cellular phone, pager, etc. Clients 110 may include software applications on a network host that are responsible for originating and/or receiving network traffic. For example, client 110A may send instant message (IM) communications that include textual messages.

Network traffic manager 120 can include any hardware and/or software elements for management of network traffic. Network traffic manager 120 may be embodied as a standalone device, appliance, or the like. In some embodiments, network manager 120 may form part of a computer system offering additional network services. One example of network traffic manager 120 is discussed further with respect to FIG. 2.

Network traffic manager 120 may be implemented in a proxy server model, a server model, an event model, or any combination thereof In the proxy server model, network traffic manager 120 may be situated in communications network 130 and acts as a proxy server between clients 110 and communications network 150. Network traffic manager 120 may support any kind of enterprise proxy protocols, such as SOCKS, HTTP, HTTPS. In the proxy server model, network traffic manager 120 may intercept network traffic, or network flows. In one example, client 110A may connect to network traffic manager 120 by specifying host and port settings of network traffic manager 120 in the proxy settings of client 110A. Network traffic manager 120 then may connect to communications network 150 on behalf of clients 110A.

In the server model, network traffic manager 120 does not appear as a proxy for clients 110. Instead, clients 102 can connect to network traffic manager 120 in a client-to-server fashion. For example, client 110B may connect using a protocol that is specially defined for use between the client 110B and network traffic manager 120.

In the event model, network traffic manager 120 may interact with another network device, such as router or appliance that is deployed on communications network 130. The router or appliance may be responsible for sending events to network traffic manager 120. The events can include information indicating that something related to network traffic has taken place in router or appliance (e.g., an HTTP GET request, an IM client signed on/off; an IM client sent a text message to another IM client; the presence status of an IM client has changed; or the like). Once receiving the event, network traffic manager 120 may access the router or appliance through an interface (typically an application programmer's interface, or API for short). Network traffic manager 120 thus receives events encapsulating various details concerning network traffic flows.

Communications network 130 can include a public network, a private network, an enterprise local area network, an extranet, a wide area network, a metropolitan area network, or the like. In some embodiments, communications network 130 may form an enterprise network that defined by firewall 140. In these embodiments, any devices behind firewall 140 may be considered part of the enterprise network. Other devices outside of firewall 140 may be considered to be outside of the enterprise network. Accordingly, clients 110 and network traffic manager can be considered part of the enterprise network. Although firewall 140 is shown, it can be understood that firewall 140 may not be included in system 100.

Communications network 150 can include a public network, a private network, an enterprise local area network, an extranet, a wide area network, a metropolitan area network, or the like. Server 160 and host 170 can include hardware and/or software elements for responding to requests from clients 110. For example, server 160 or host 170 may include a web server, an application server, an FTP server, a VoIP server, a peer-to-peer (P2P) program, or the like.

In one example of operation, network traffic monitor 120 can provide capabilities to filter or otherwise authenticate network traffic. For example, upon receiving HTTP URL traffic from client 110A, network traffic monitor 120 may analyze the HTTP URL traffic to determine domain information, hostname information, and URL information associated with the network traffic. In some embodiments, network traffic monitor 120 may block the HTTP URL traffic based on a domain name, a hostname, or URL associated with the network traffic.

Figure 2:
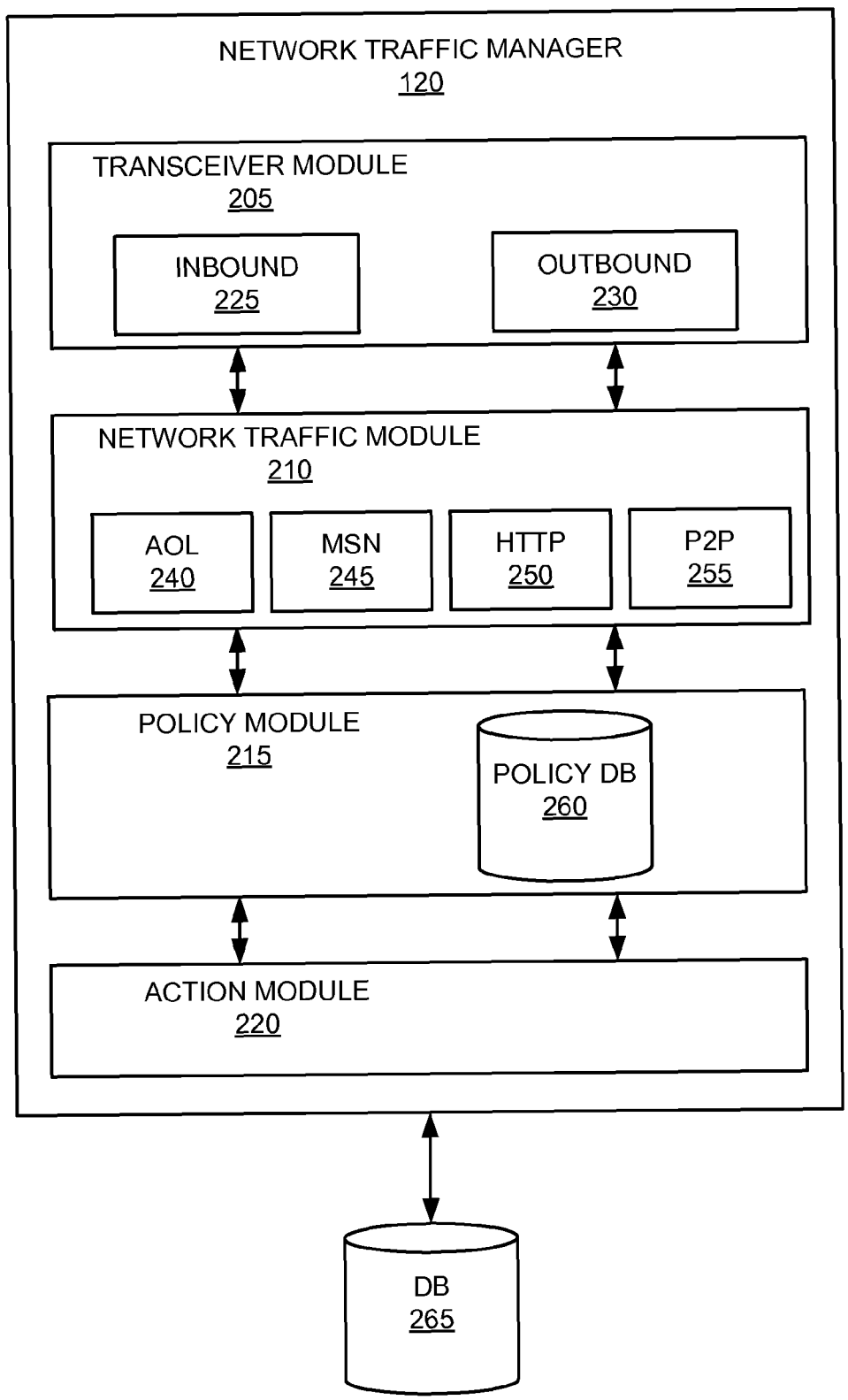
FIG. 2 is a block diagram of an embodiment of a network traffic manager in one embodiment according to the present invention.

FIG. 2 is a block diagram of an embodiment of network traffic manager 120 in one embodiment according to the present invention. Network traffic manager 120 can include transceiver module 205, network traffic module 210, policy module 215, and action module 220.

Transceiver module 205 can include hardware and/or software elements for receiving and transmitting network traffic. In one embodiment, transceiver module 205 may include inbound transceiver module 225 and outbound transceiver module 230. Inbound transceiver module 225 may handle network traffic received at network traffic manager 120, such as from clients 110 or server 160 of FIG. 1, and outbound transceiver module 230 may handle outbound network traffic generated network traffic manager 120, which may include network traffic generated on behalf of clients 110 or to server 160. For example, inbound transceiver module 225 may receive network traffic in the form of HTTP traffic, VoIP traffic, instant message communications, or the like from clients 110. Also, outbound transceiver module 230 may send TCP/IP traffic to clients 110, server 160, or host 170. In one embodiment, transceiver module 205 can receive network traffic through different models, such as a proxy model, a server model, and an event model. A person skilled in the art will appreciate other models that may be used to receive messages at network traffic manager 120.

In various embodiments, when transceiver module 205 receives network traffic, transceiver module 205 may send the network traffic to network traffic module 210. Network traffic module 210 can include hardware and/or software elements for operating on a network gateway, a server computer, or any other type of computer or other network hardware. Network traffic module 210 may be responsible for identifying the network traffic produced by an application, referred to as a network flow, and the identity of users, applications, and/or machines responsible for network flows.

In one embodiment, network traffic module 210 can receive data about network flows from different sources. For example, network traffic monitor 120 may monitor network traffic, or network flows, in system 100. Network traffic monitor 120 may utilize network traffic module 210 to collect information on network flows being sent or received by network applications within system 100, such as the source and destination addresses of, the size of network data in network packets, the contents of network packets, the rate of related network packets in a network flow, and any other attributes of one or more network packets in a network flow.

Network traffic module 210 may use information obtained by network traffic monitor 120 to reliably identify network flows and associated network applications. In an embodiment, network traffic module 210 can employ a hash-based resource matching techniques for identifying network traffic to be filter or otherwise authenticated.

In various embodiments, network traffic module 210 can interface with policy module 215. Policy module 215 can include hardware and/or software elements for enabling network administrators to set policies for network flows. A policy can include a set of rules, conditions, and actions. A policy may further be associated with one or more users, groups of users, devices, machines, or the like. Policies can be used to block, throttle, accelerate, enhance, or transform network traffic that is part of an identified network flow. In an embodiment, policies for network flows may be enforced by network traffic controlling devices such as switches, routers, firewalls, proxies, IPS, and EPS systems. Network traffic module 210 and policy module 215 can communicate with network traffic controlling devices via any interface or protocol, such as SNMP.

Policy module 215 may accesses a number of policies that include actions for network traffic. In one embodiment, policy module 215 may include policy database 260 that stores a set of policies. As shown, policy database 260 is located in policy module 215; however, it will be understood that policy database 260 may be located anywhere in network traffic manager 120 or be separate from network traffic manager 120.

The policies in policy database 260 may include actions that can be taken by network traffic monitor 120. The policies may be applied to a packet, group of packets, network flow, or the like. Policy module 215 may determine from user information, group information, machine information, characteristics related to network flows, or the like whether any policies in policy database 260 applies. Once a policy is determined by policy module 215, action module 220 may be configured to perform the action corresponding to the determined policy.

In various embodiments, database 265 may be used to store information usable for network traffic monitor 120. Database 265 may be included in network traffic monitor 120 or be separate from network traffic monitor 120. In one embodiment, database 265 can includes one or more information items including but not limited to: hash tables, lookup records, credential information, user information, user to IP address mappings, client identifications for clients 110, policies that may be implemented by policy module 215, or the like. This information is used by modules in network traffic manager 120 for any purpose.

Figure 3:
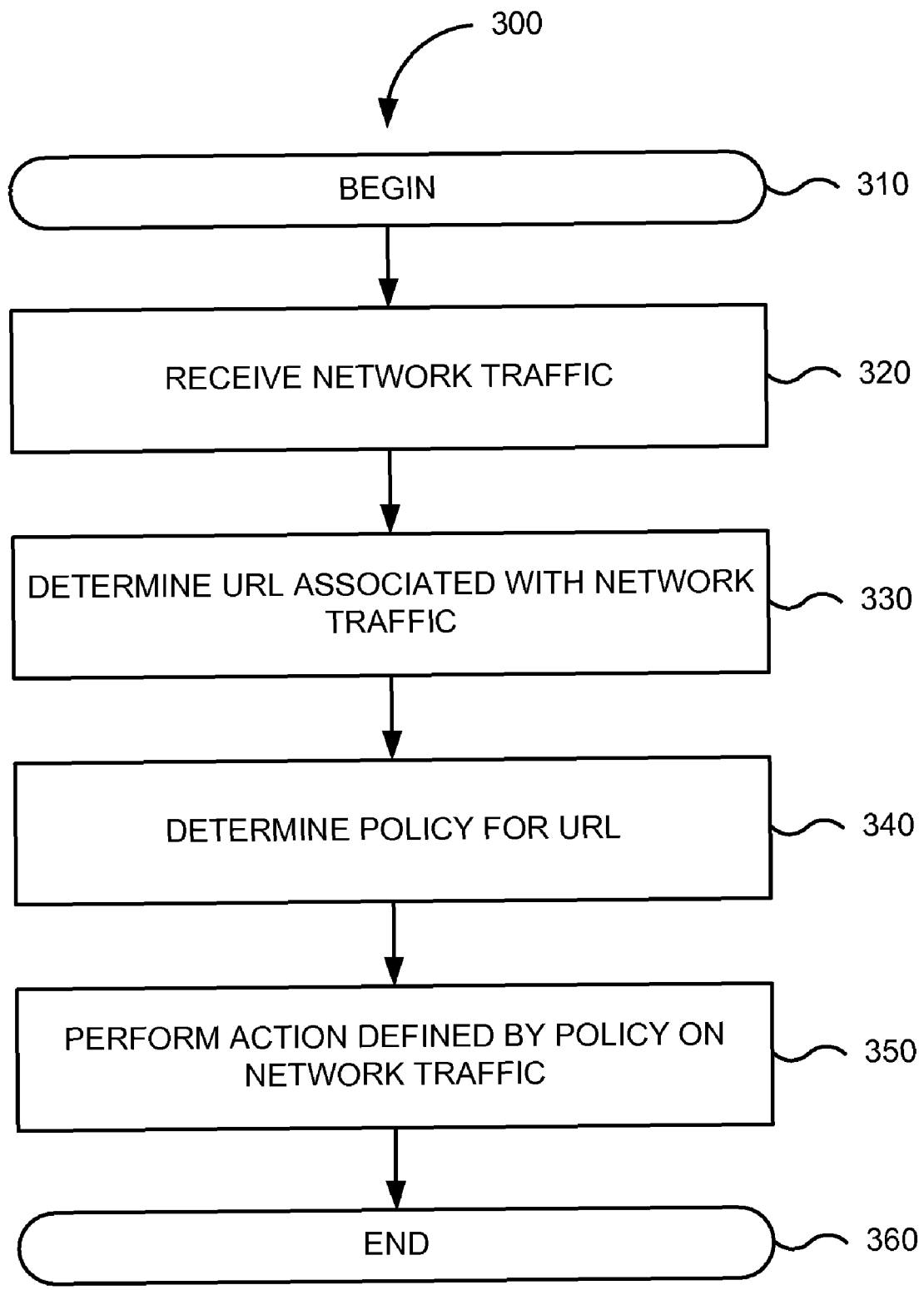
FIG. 3 is a simplified flowchart of a method for policy-based management of network traffic in one embodiment according to the present invention.

FIG. 3 is a simplified flowchart of method 300 for policy-based management of network traffic in one embodiment according to the present invention. The processing of method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. FIG. 3 begins in step 310.

In step 320, network traffic is received. For example, network traffic monitor 120 of FIG. 1 may monitor or otherwise obtain information about network traffic of communications network 130. In step 330, a uniform resource locator (URL) associated with the network traffic is determined. In various embodiments, this step may include identifying a network address (e.g., an IP address) of the source of the network traffic, a network address of a destination of the network traffic, a domain name associated with the network traffic, a hostname associated with the network traffic, a path or other identifier to one or more resources, or the like.

In step 340, a policy is determined for the URL. In step 350, an action defined by the determined policy is performed on or with the network traffic. Some examples of actions to be performed on network traffic may include actions to block, throttle, accelerate, enhance, or transform network traffic. FIG. 3 ends in step 360.

Figure 4A:
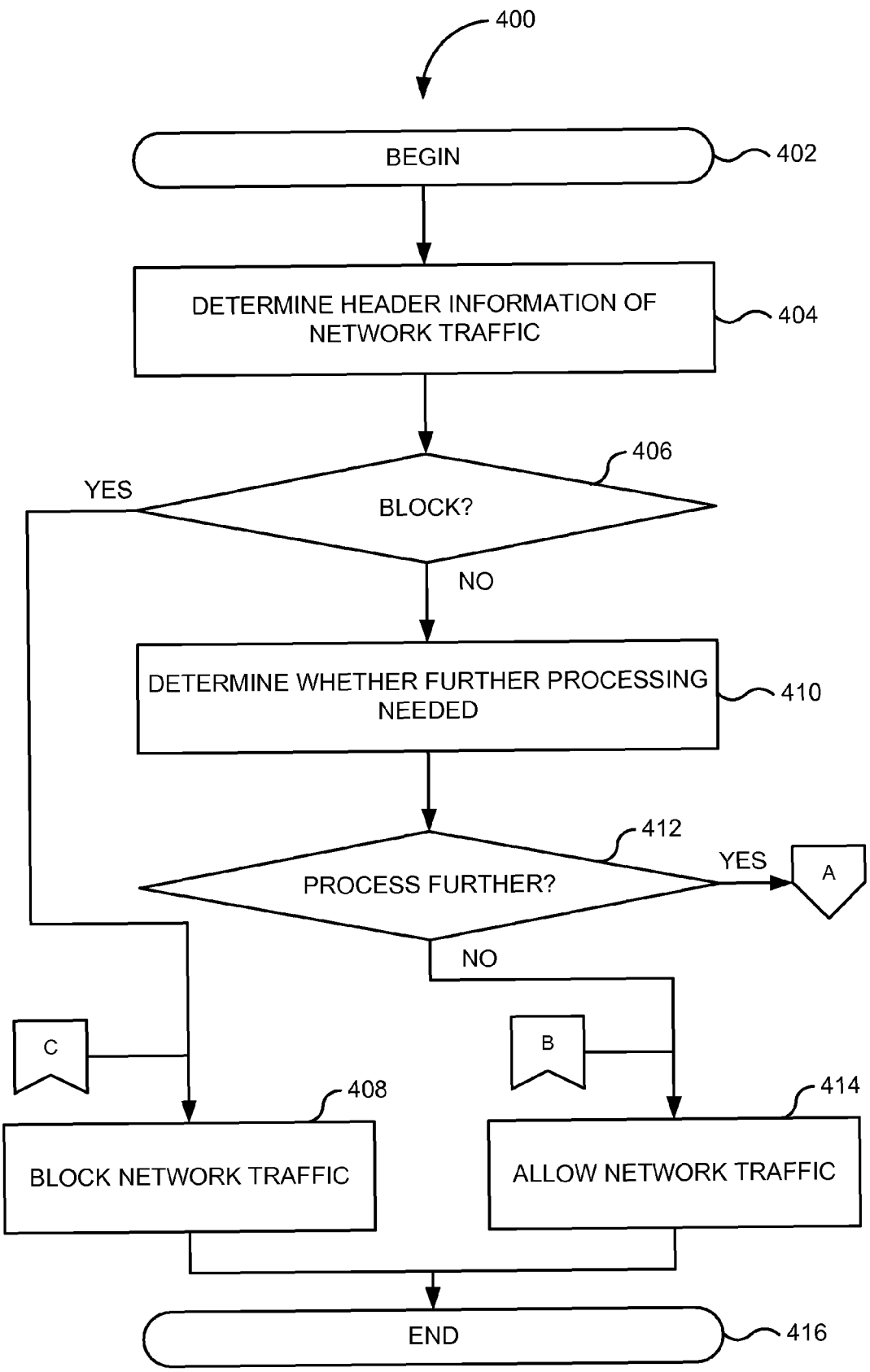
FIGS. 4A, 4B, 4C, and 4D are a flowchart of a method for filtering network traffic in one embodiment according to the present invention.

FIGS. 4A, 4B, 4C, and 4D are a flowchart of method 400 for filtering network traffic in one embodiment according to the present invention. FIG. 4A begins in step 402.

In step 404, header information is determined from network traffic. For example, one or more of TCP/IP properties, addresses, flags, fields, or the like, may be determined. In step 406, if it is determined to block the network traffic based on header information, in step 408, the network traffic is blocked.

In step 406, if it is determined to not block the network traffic based on header information, in step 410 a determination is made whether further processing is needed. In step 412, if no further processing is needed, in step 414, the network traffic is allowed. The blocking of the network traffic in step 408 or the allowing of the network traffic in step 414 may end the processing of method 400 in step 416.

Figure 4B:
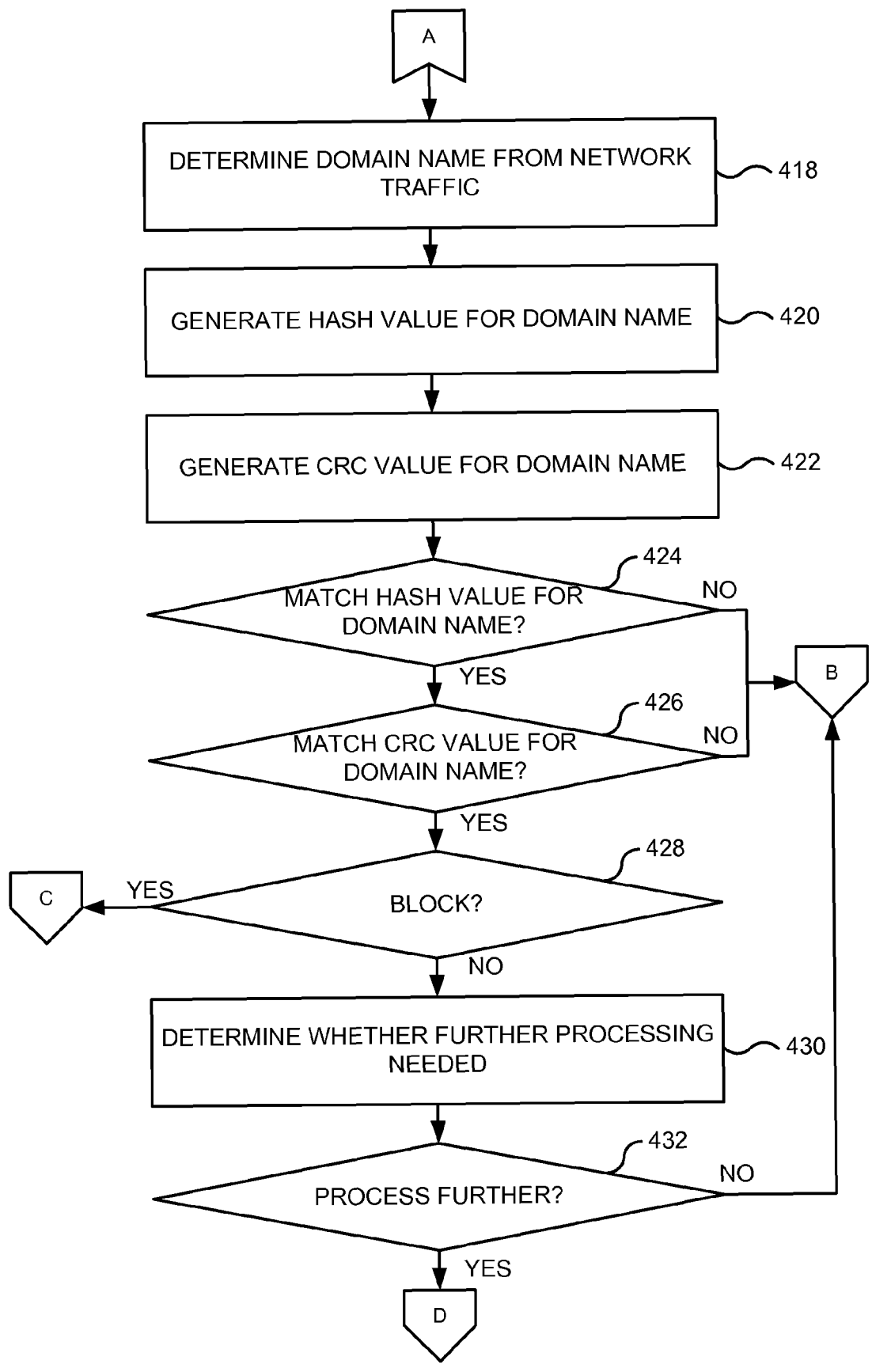

In step 412, if further processing is needed, the processing of method 400 continues in step 418 of FIG. 4B. Referring to FIG. 4B, in step 418, a domain name is determined from the network traffic. For example, the domain name may be extracted from HTTP packets. In another example, a name service may provide the domain name in response to a network address retrieved from the network traffic.

In step 420, a hash value is generated for the domain name. One or more hashing functions or hash generation techniques may be implemented to generate the hash value for the domain name. Some examples of hashing functions are MD5, SHA-1, HMAC, linear hashes, rolling hashes, or the like. In one example, characters or symbols representing the domain name are used as input to one or more hashing functions to obtain the hash value. In step 422, a CRC value is generated for the domain name. One or more functions or CRC generation techniques may be implemented to generate the CRC value for the domain name. In some embodiments, a hashing function may be used to generate the CRC value.

In step 424, a determination is made whether a match can be made with the hash value generated for the domain name. For example, the hash value generated for the domain name may be used as an index into a sparse array. The presence of an entry in the sparse array may be indicative of a match. The absence of an entry in the sparse array may be an indication of a non-match. In step 424, if a match cannot be made with the hash value generated for the domain name, the processing of method 400 continues in step 414 of FIG. 4A, where the network traffic is allowed.

In step 424, if a match can be made with the hash value generated for the domain name, in step 426, a determination is made whether a match can be made with the CRC value generated for the domain name. In one example, a match can be made is the generated CRC value is the same as or equivalent to another value, such as a stored value. In another example, the presence or absence in a hash table using the CRC value as an index may be indicative of whether a match can be made. In step 426, if a match cannot be made with the CRC value generated for the domain name, the processing of method 400 continues in step 414 of FIG. 4A, where the network traffic is allowed.

In step 424, if a match can be made with the CRC value generated for the domain name, in step 428, a determination is made whether to block (i.e., filter) the network traffic. In step 428, if a determination is made to block or otherwise disallow the network traffic, the processing of method 400 continues in step 408 of FIG. 4A, where the network traffic is blocked. In step 428, if a determination is made to not block the network traffic, a determination is made in step 430 whether further processing is needed. In step 432, if a determination is made that no further processing is needed for the network traffic, the processing of method 400 continues in step 414 of FIG. 4A, where the network traffic is allowed.

Figure 4C:
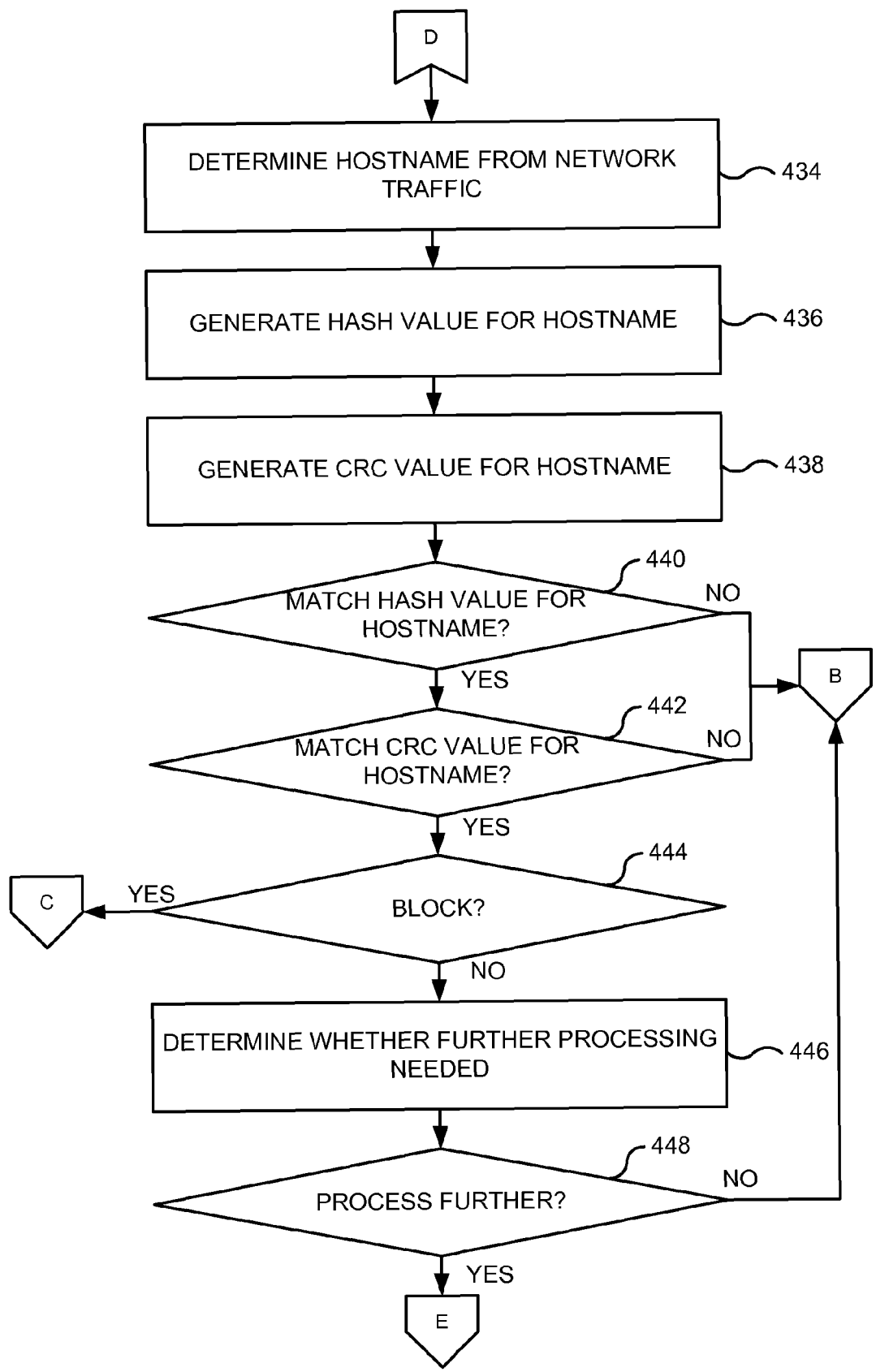

In step 432, if a determination is made that further processing is needed, the processing of method 400 continues in step 434 of FIG. 4C. Referring to FIG. 4C, in step 434, a hostname associated with the network traffic is determined. In step 436, a hash value is generated for the hostname. In step 438, a CRC value is generated for the hostname.

In step 440, a determination is made whether a match can be made with the hash value generated for the hostname. For example, the hash value generated for the hostname may be used as an index into a sparse array. The presence of an entry in the sparse array may be indicative of a match. The absence of an entry in the sparse array may be an indication of a non-match. In step 440, if a match cannot be made with the hash value generated for the hostname, the processing of method 400 continues in step 414 of FIG. 4A, where the network traffic is allowed.

In step 440, if a match can be made with the hash value generated for the hostname, in step 442, a determination is made whether a match can be made with the CRC value generated for the hostname. In step 442, if a match cannot be made with the CRC value generated for the hostname, the processing of method 400 continues in step 414 of FIG. 4A, where the network traffic is allowed.

In step 442, if a match can be made with the CRC value generated for the hostname, in step 444, a determination is made whether to block (i.e., filter) the network traffic. In step 444, if a determination is made to block or otherwise disallow the network traffic, the processing of method 400 continues in step 408 of FIG. 4A, where the network traffic is blocked. In step 444, if a determination is made to not block the network traffic, a determination is made in step 446 whether further processing is needed. In step 448, if a determination is made that no further processing is needed for the network traffic, the processing of method 400 continues in step 414 of FIG. 4A, where the network traffic is allowed.

Figure 4D:
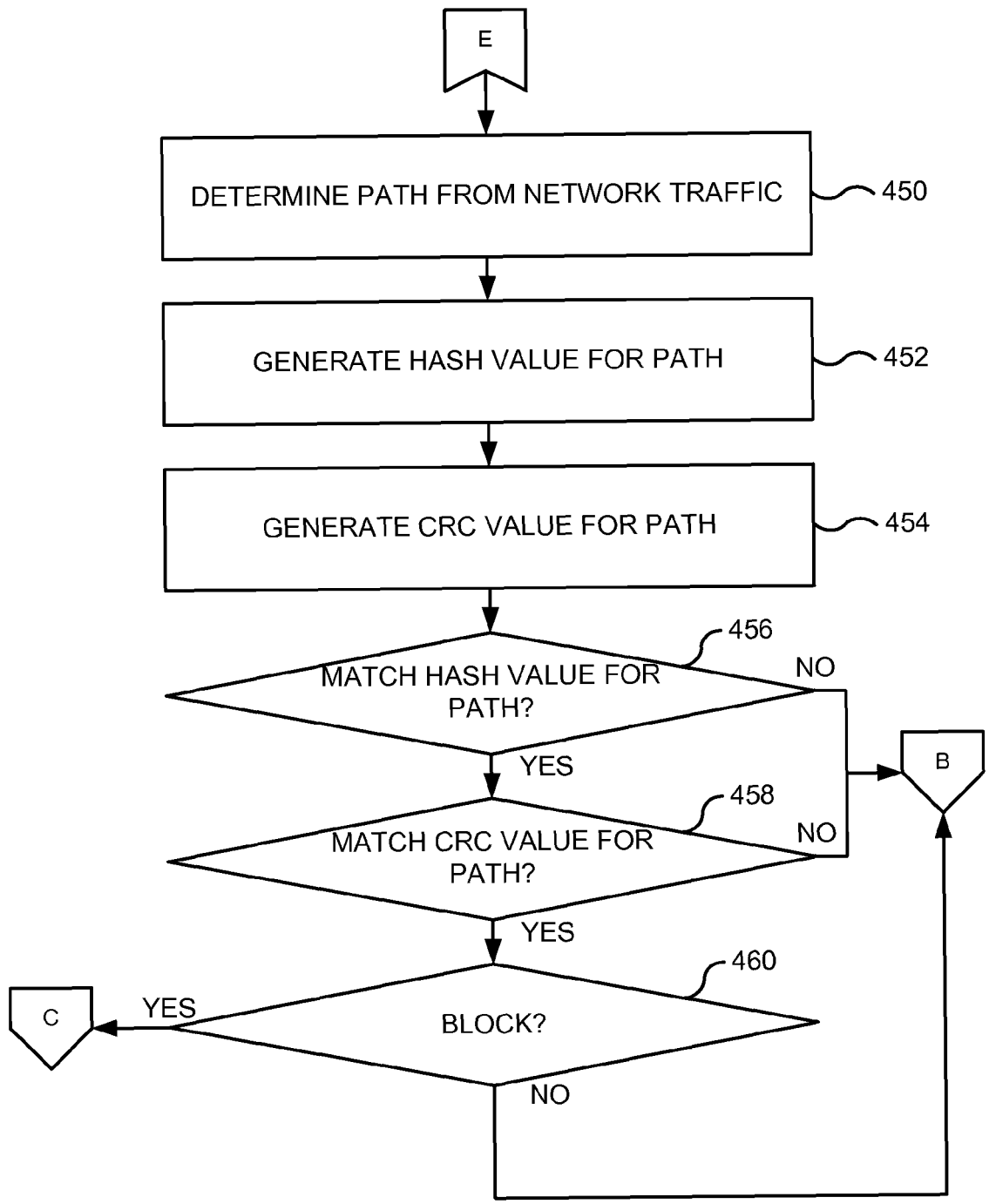

In step 448, if a determination is made that further processing is needed, the processing of method 400 continues in step 450 of FIG. 4D. Referring to FIG. 4D, in step 450, a path associated with the network traffic is determined. A path can include all or a portion of a URL. In one example, the path may be extract from an HTTP GET or POST request. In step 452, a hash value is generated for the path. The hash value may be generated for all or a portion of the path. In step 454, a CRC value is generated for the path. The CRC value may be generated for all or a portion of the path.

In step 456, a determination is made whether a match can be made with the hash value generated for the path. In step 456, if a match cannot be made with the hash value generated for the path, the processing of method 400 continues in step 414 of FIG. 4A, where the network traffic is allowed.

In step 456, if a match can be made with the hash value generated for the hostname, in step 458, a determination is made whether a match can be made with the CRC value generated for the path. In step 458, if a match cannot be made with the CRC value generated for the path, the processing of method 400 continues in step 414 of FIG. 4A, where the network traffic is allowed.

In step 458, if a match can be made with the CRC value generated for the path, in step 460, a determination is made whether to block (i.e., filter) the network traffic. In step 460, if a determination is made to block or otherwise disallow the network traffic, the processing of method 400 continues in step 408 of FIG. 4A, where the network traffic is blocked. In step 460, if a determination is made to not block the network traffic, the processing of method 400 continues in step 414 of FIG. 4A, where the network traffic is allowed.

Accordingly, in various embodiments, one or more hash values may be used to match resources in order to filter network traffic. In some embodiments, the hashing of domain names, host names, and URLs may serve as an index into an array, thereby speeding up table lookups or data comparison tasks for filtering network traffic, or the like.

Figure 5:
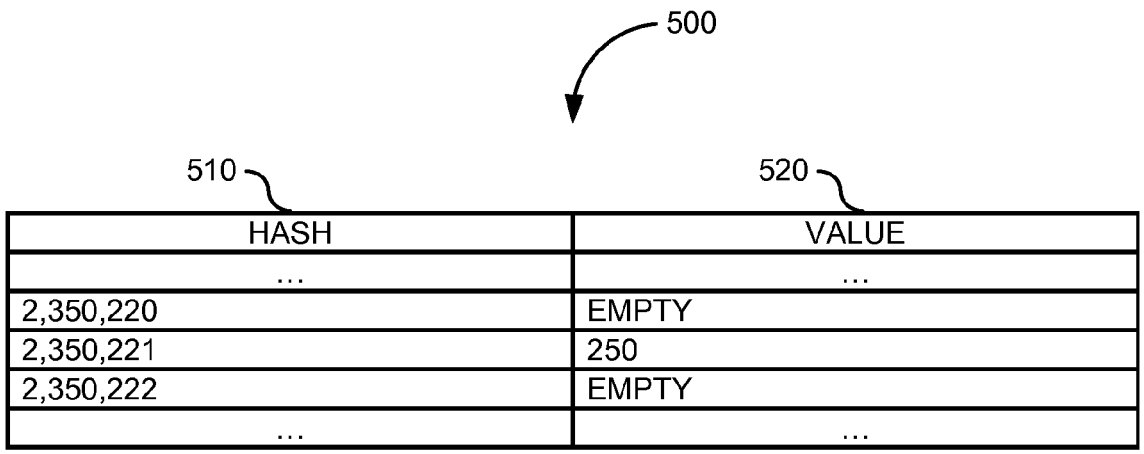
Figure 6:
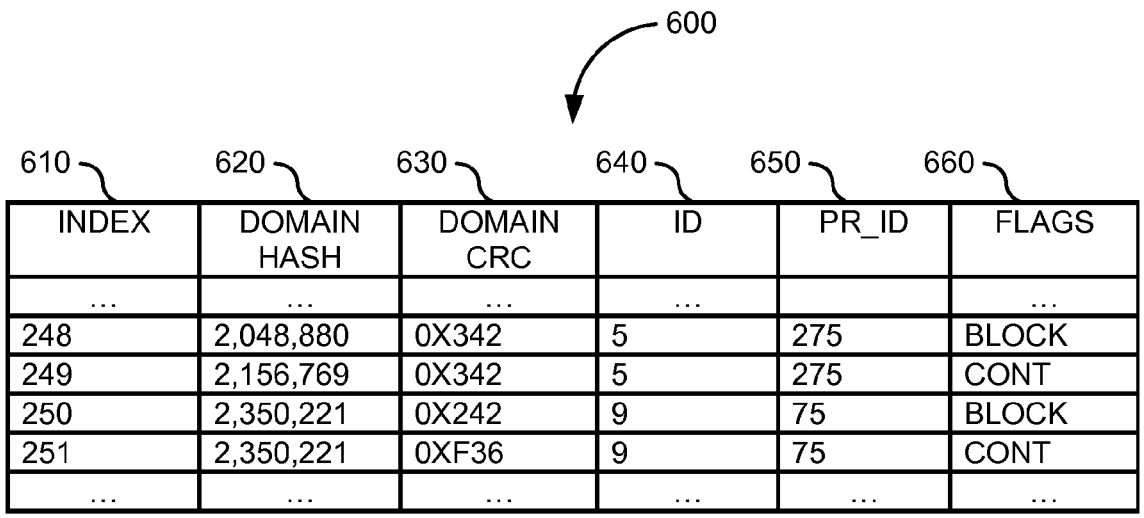

FIGS. 5, 6, and 7 are diagrams of hash tables 500, 600, and 700 that may be used for filtering network traffic in one embodiment according to the present invention. In various embodiments, hash tables similar to tables 500, 600, and 700 may be pre-populated or built at startup of network traffic monitor 120 of FIG. 1. In other embodiments, network traffic monitor 120 may download updated versions of hash tables for resource matching from a network server.

In this example, table 500 of FIG. 5 includes hash column 510 and value column 520. Table 500 may be stored as a database table, flat file, in-memory data structure, or the like. Hash column 510 may be used to store an index value or unique key. Hash column 510 may store a value for matching with the output of one or more hashing functions for a domain name where the output hash value acts as the index or key to a particular row of table 500. Value column 520 may be used to store a reference for further processing. For example, value column 520 may store an index or pointer to an entry or record of table 600. In one example, value column 520 may be populated with pre-computed values or indexes that point to records for a set of domain names that potentially may be filtered by network traffic monitor 120 of FIG. 1.

Table 600 of FIG. 6 includes index column 610, domain hash column 620, domain CRC column 630, ID column 640, PR_ID column 650, and flags column 660. Table 600 may be stored as a database table, flat file, in-memory data structure, or the like. Index column 610 may be used to store an index value or unique key. Index column 610 may store a value for matching with the output of one or more hashing functions for a hostname where the output hash value acts as the index or key to a particular row of table 600.

Domain hash column 620 may store the output (e.g., a number or value) of one or more hash functions for a given domain name. Domain CRC column 630 may store the output of one or more check or CRC functions for a given domain name. Flags column 660 may store information for processing network traffic associated with a given domain name. For example, flags column 660 may include information indicating that network traffic directed to or from a given domain name should be blocked, or that further processing is needed for one or more hostnames associated with the domain name.

In various embodiments, if further processing for a given domain name is needed, tables similar to tables 500 and 600 may be used to match one or more hostnames associated with the domain name. A flags column may include information indicating that network traffic directed to or from a given hostname should be blocked, or that further processing is needed for one or more URLs or path identifiers associated with a given hostname and domain name. Each hostname record in a table may further include an index or pointer to one or more URL records.

In one example, table 700 of FIG. 7 includes index column 710, hostname hash column 720, hostname CRC column 730, length column 740, URL hash column 750, URL CRC column 760, ID column 770, PR_ID column 780, and flags column 790. Table 700 may be stored as a database table, flat file, in-memory data structure, or the like. Index column 710 may be used to store an index value or unique key. Index column 710 may store a value for matching with the output of one or more hashing functions for a hostname where the output hash value acts as the index or key to a particular row of table 700.

Hostname hash column 720 may store the output (e.g., a number or value) of one or more hash functions for a given hostname. Hostname CRC column 730 may store the output of one or more check or CRC functions for a given hostname. Length column 740 may store a value representing the length of a URL for which a hash value and a CRC value are stored in URL hash column 750 and URL CRC column 760, respectively. Flags column 790 may store information for processing network traffic with a given URL. For example, flags column 660 may include information indicating that network traffic having all or a portion of the URL should be blocked, allowed, or further examined.

Figure 8A:
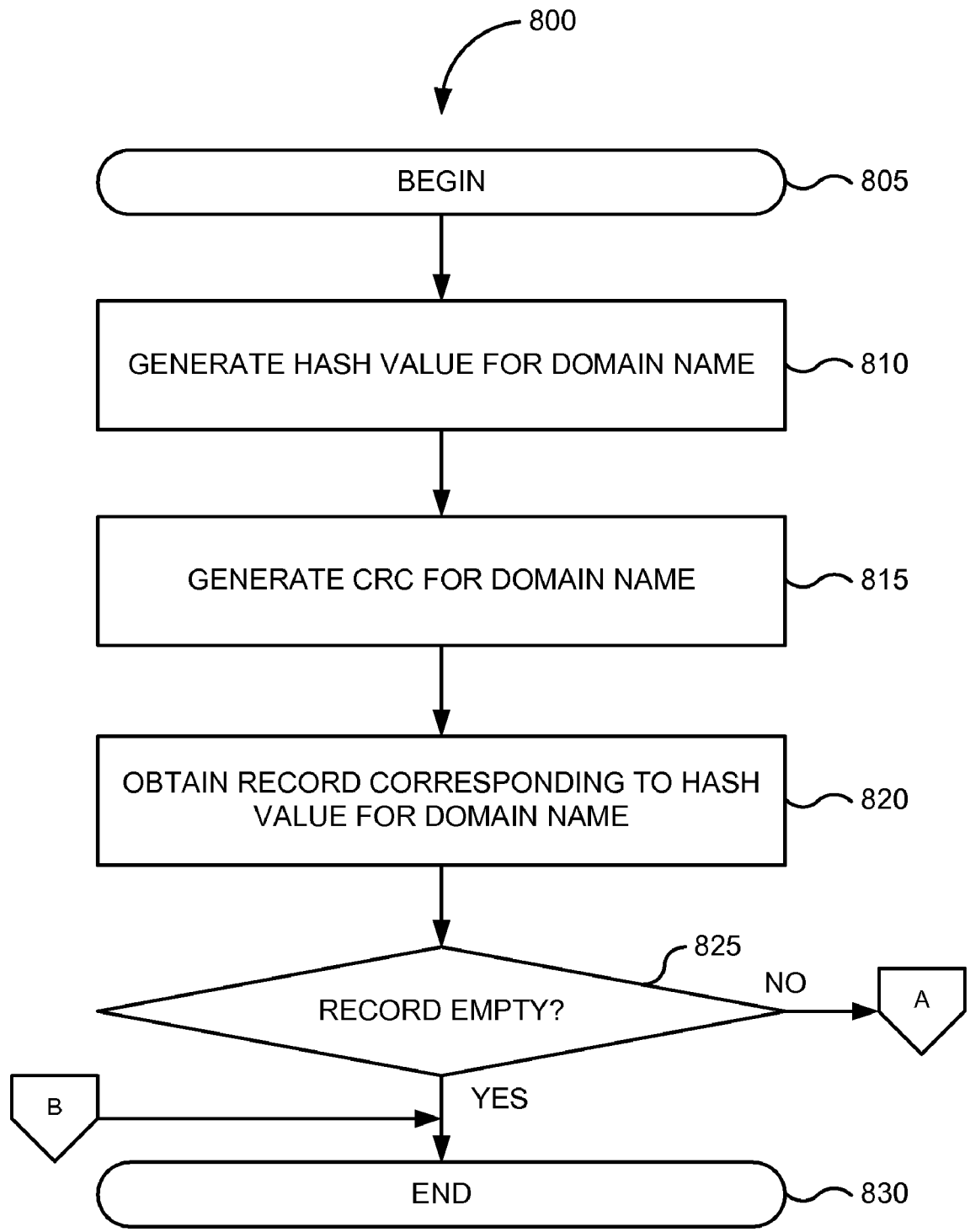
FIGS. 8A and 8B are flowcharts of a method for domain name filtering of network traffic using the hash tables of FIGS. 5, 6, and 7 in one embodiment according to the present invention.
Figure 8B:
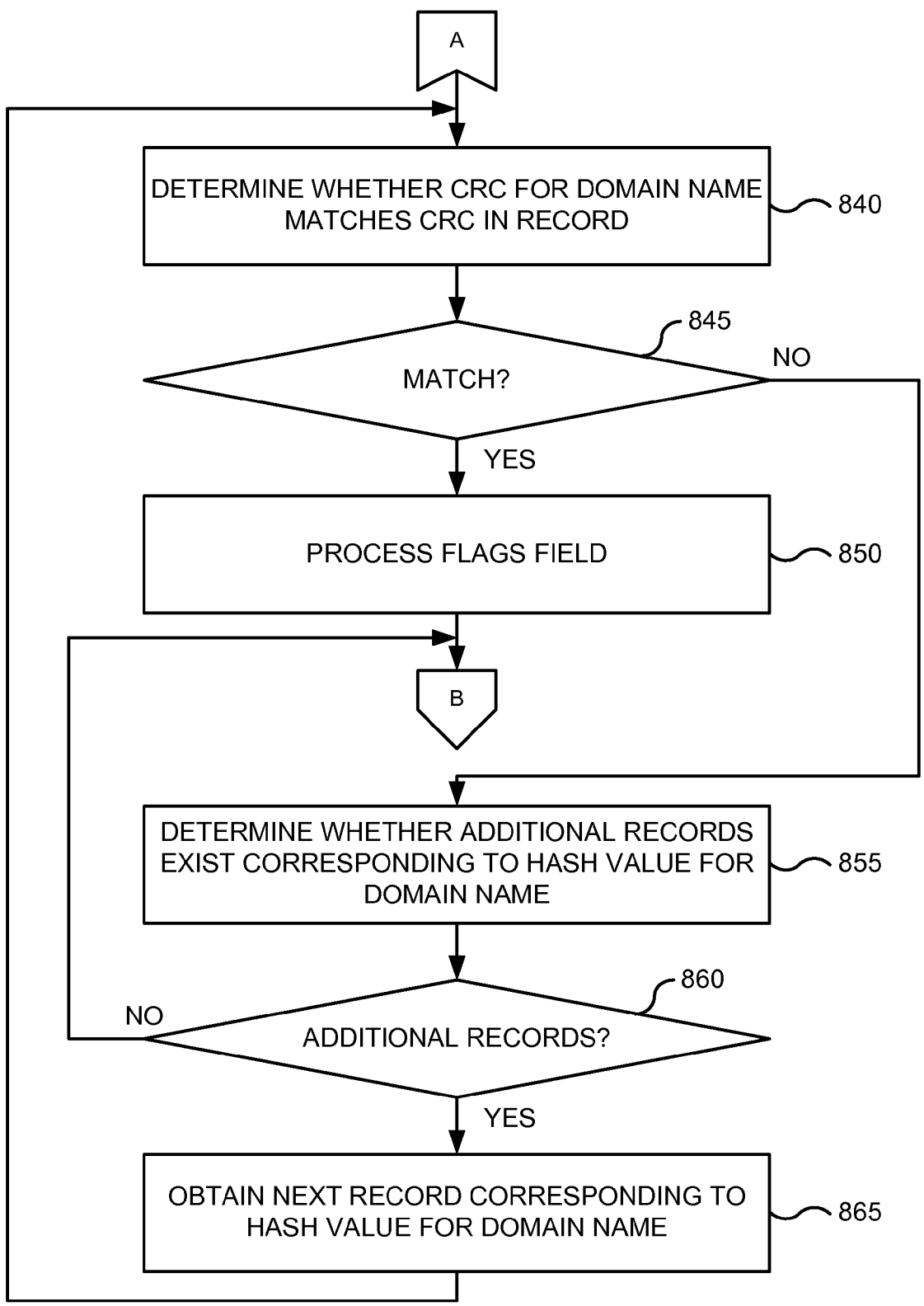

FIGS. 8A and 8B are flowcharts of method 800 for domain name filtering of network traffic using the hash tables of FIGS. 5, 6, and 7 in one embodiment according to the present invention. FIG. 8A begins in step 805.

In step 810, a hash value for a domain name is generated. In step 815, a CRC value for the domain name is generated. In step 820, a record corresponding to the hash value generated for the domain name is obtained. For example, the hash value generated for the domain name may be used as an index into a hash table. The corresponding bucket or record of the hash table may be empty (or NULL), or may include a reference or pointer to a record for the domain name. In step 825, a determination is made whether the record is empty. In step 825, if the record is empty, then filtering may not be necessary on network traffic associated with the domain name, and the processing of method 800 ends in step 830.

In step 825, if the record is not empty (e.g., a reference or pointer exists to a record for the domain name), the processing of method 800 continues in step 840 of FIG. 8B. In step 840, a determination is made whether the CRC value generated for the domain name matches a CRC value in the record. In step 845, if a determination is made that the CRC value generated for the domain name matches a CRC value in the record then a flags field is processed in step 850. The flags field may indicate to block network traffic associated with the domain name. In some embodiments, the flags field may indicate that further processing is required for one or more hostnames and/or URLs associated with the domain name. One example of further processing of hostnames is discussed further with respect to FIGS. 9A and 9B. One example of further processing of URLs is discussed further with respect to FIGS. 10A, 10B, and 10C. The processing of method 800 then ends in step 830 of FIG. 8A.

In step 845, if a determination is made that the CRC value generated for the domain name does not match a CRC value in the record then a determination is made whether additional records exist corresponding to the hash value generated for the domain name. For example, one or more collisions may be encountered by the hash value. Thus, in step 860, if no collisions are detected such that no additional records exist corresponding to the hash value generated for the domain name, then processing of method 800 ends in step 830 of FIG. 8A.

In step 860, if collisions are detected such that additional records exist corresponding to the hash value generated for the domain name then the next record corresponding to the hash value generated for the domain name is obtained in step 865. The processing of method 800 continues in step 840 where a determination is made whether the CRC value generated for the domain name matches a CRC value in the record.

In one example, assume that the hash value generate for the domain "abc.com" is the same or equivalent to the hash value generated for the domain "cba.com." Further, assume that the generated hash value is "2,350,221." Hash column 510 of table 500 for the entry "2,350,221" includes the value of "250." In other words, domain names hashing to the value of "2,350,221" point to an entry or row in table 600 indexed by the value of "250". Beginning with the row having index column 610 of table 600 with the value of "250", a determination is made whether the value stored in the domain hash column 620 matches the hash value generated for the domain name and whether the value stored in the domain CRC column 640 matches the CRC value generated for the domain name.

In various embodiments, if a match is not found with the first record of table 600 pointed to by table 500, each record in table 600 with the corresponding value of "2,350,221" in domain hash column 620 may then be examined for a match between hash values and CRC values generated for the domain name. Entries in table 600 may be sorted or optimized to facilitate searching for collisions.

In further embodiments, flags column 660 of table 600 may indicate that the domain name associated with the network traffic is to be blocked. Flags column 660 of table 600 may also indicate that further processing may be need for hostnames or URLs associated with the network traffic.

Figure 9A:
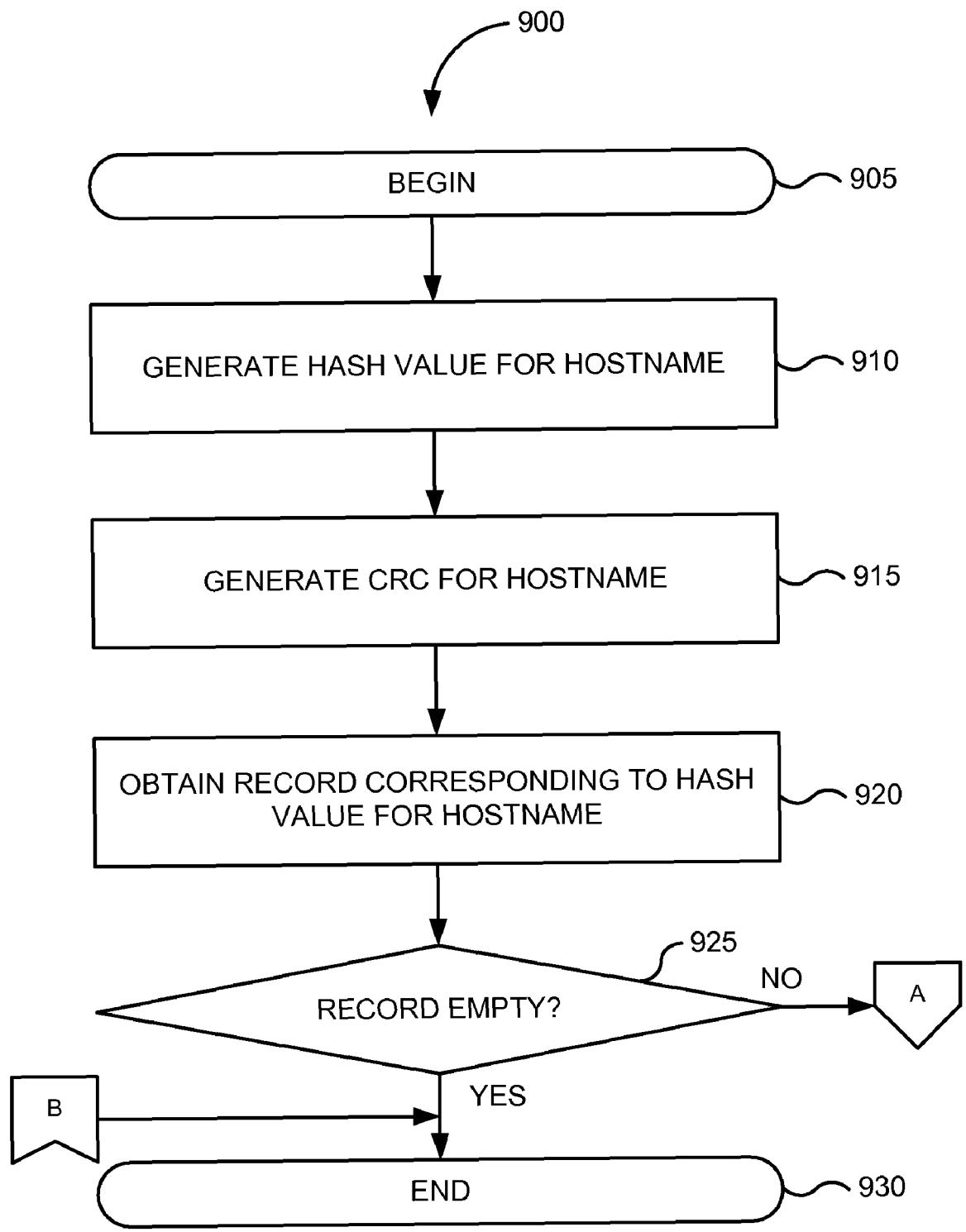
FIGS. 9A and 9B are flowcharts of a method for hostname filtering of network traffic using the hash tables of FIGS. 5, 6, and 7 in one embodiment according to the present invention.
Figure 9B:
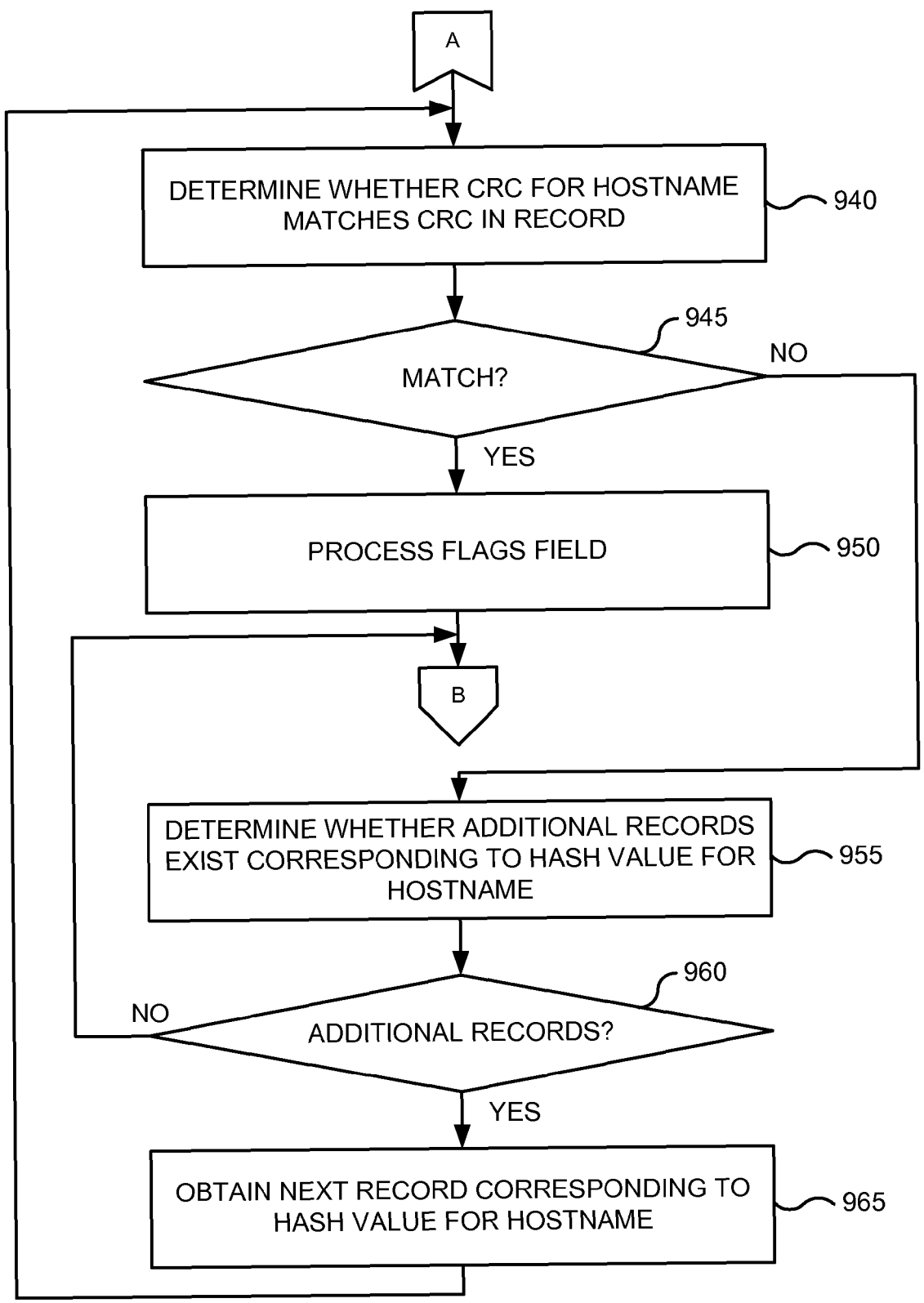

FIGS. 9A and 9B are flowcharts of method 900 for hostname filtering of network traffic using the hash tables of FIGS. 5, 6, and 7 in one embodiment according to the present invention. FIG. 9A begins in step 905.

In step 910, a hash value for a hostname is generated. In step 915, a CRC value for the hostname is generated. In step 920, a record corresponding to the hash value generated for the hostname is obtained. For example, the hash value generated for the hostname may be used as an index into a hash table. The corresponding bucket or record of the hash table may be empty (or NULL), or may include a reference or pointer to a record for the hostname. In step 925, a determination is made whether the record is empty. In step 925, if the record is empty, then filtering may not be necessary on network traffic associated with the hostname, and the processing of method 900 ends in step 930.

In step 925, if the record is not empty (e.g., a reference or pointer exists to a record for the domain name), the processing of method 900 continues in step 940 of FIG. 9B. In step 940, a determination is made whether the CRC value generated for the hostname matches a CRC value in the record. In step 945, if a determination is made that the CRC value generated for the hostname matches a CRC value in the record then a flags field is processed in step 950. The flags field may indicate to block network traffic associated with the hostname. In some embodiments, the flags field may indicate that further processing is required for one or more paths or URLs associated with the domain name.

In step 945, if a determination is made that the CRC value generated for the hostname does not match a CRC value in the record then a determination is made whether additional records exist corresponding to the hash value generated for the hostname. For example, one or more collisions may be encountered by the hash value. Thus, in step 960, if no collisions are detected such that no additional records exist corresponding to the hash value generated for the hostname, then processing of method 900 ends in step 930 of FIG. 9A.

In step 960, if collisions are detected such that additional records exist corresponding to the hash value generated for the hostname then the next record corresponding to the hash value generated for the hostname is obtained in step 965. The processing of method 900 continues in step 940 where a determination is made whether the CRC value generated for the hostname matches a CRC value in the record.

In further embodiments, a flags field may indicate that the hostname associated with the network traffic is to be blocked. The flags field also may indicate that further processing may be need for URLS associated with the network traffic. FIGS.

Figure 10A:
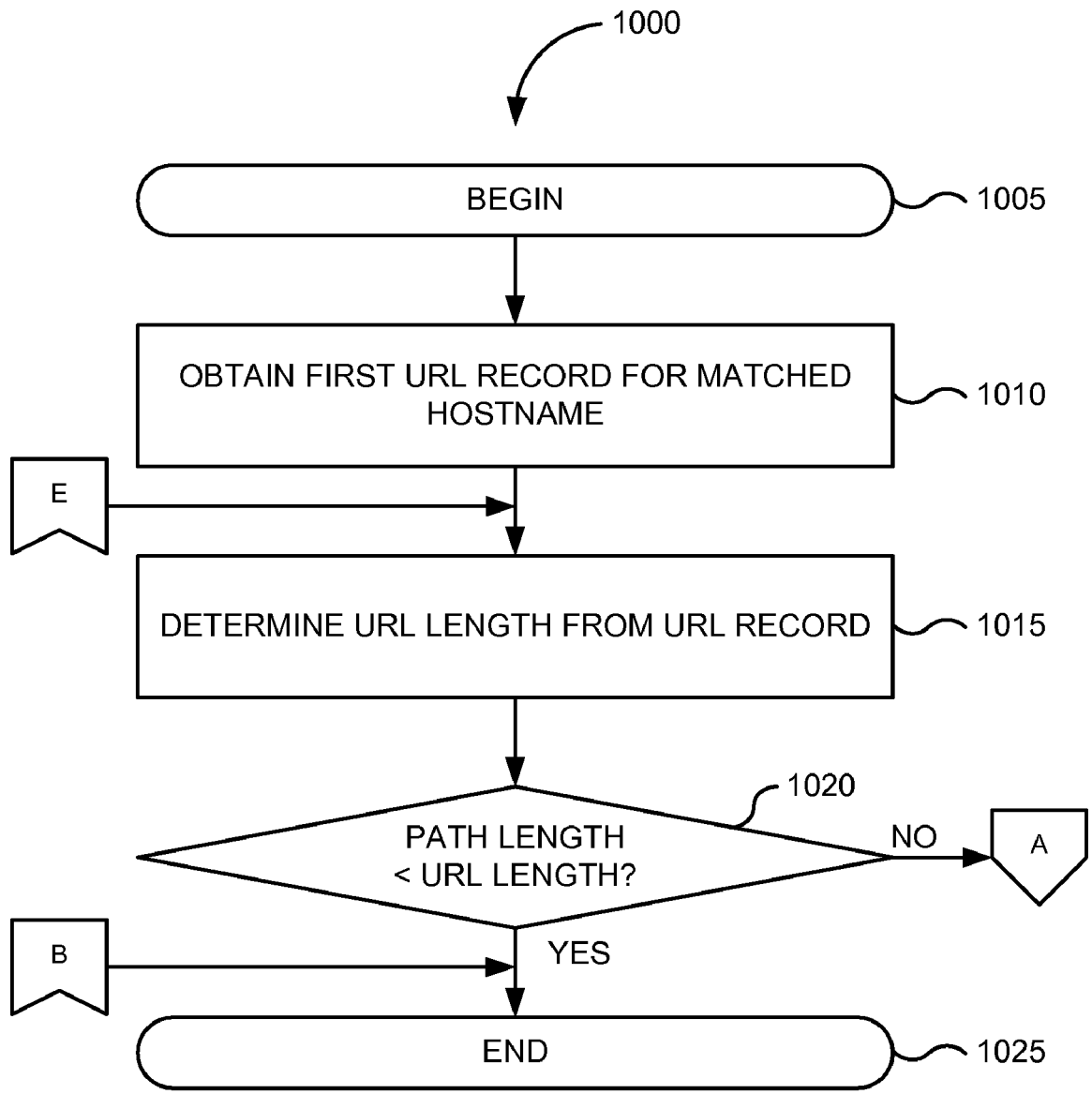
FIGS. 10A, 10B, and 10C are flowcharts of a method for URL filtering of network traffic using the hash tables of FIGS. 5, 6, and 7 in one embodiment according to the present invention.

10A, 10B, and 10C are flowcharts of method 1000 for URL filtering of network traffic using the hash tables of FIGS. 5, 6, and 7 in one embodiment according to the present invention. FIG. 10A begins in step 1005.

In step 1010, a URL record corresponding to a matched hostname is obtained. For example, the hash value generated for the hostname may be used as an index into a hash table. The corresponding bucket or record of the hash table may be empty (or NULL), or may include a reference or pointer to a record for the hostname. A hash value for a given hostname may have a corresponding set of URL records for the hostname.

In step 1015, a URL length is determined from the URL record. The URL length may specify the number of characters or symbols that were used to represent a path or URL. In step 1020, a determination is made whether the length of a path associated with the network traffic is less than the URL length from the URL record. This may be a simple, quick check to determine that a match between a path and a URL record. In step 1020, if a determination is made that the path length is less than the URL length, then the processing of method 1000 ends in step 1025.

Figure 10B:
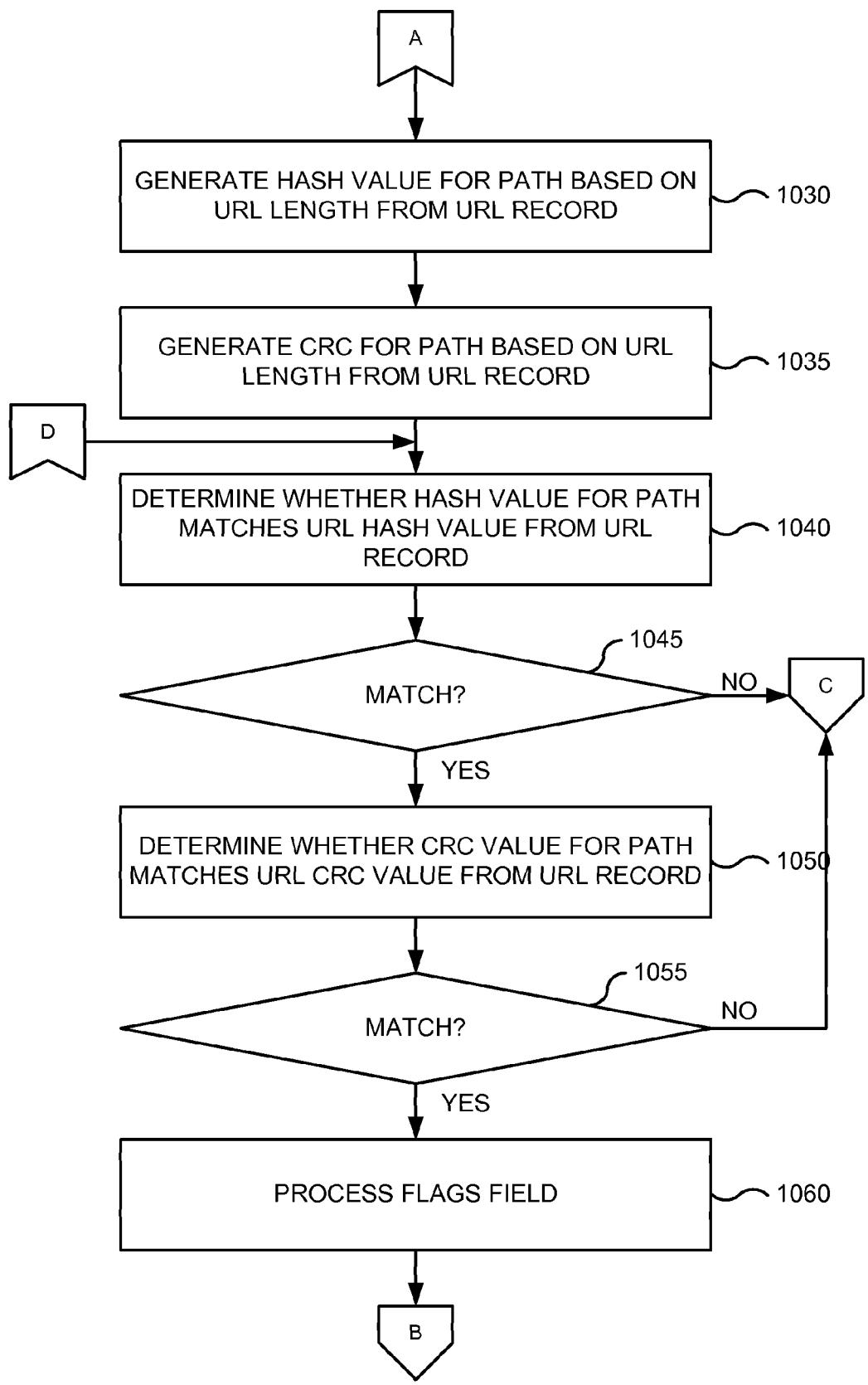

In step 1020, if a determination is made that the path length of a path associated with the network traffic is no less than the URL length from the URL record, then the processing of method 1000 continues in step 1030 of FIG. 10B. Referring to FIG. 10B, in step 1030, a hash value is generated for the path based on the URL length from the URL record. For example, if the path includes 30 characters, but the URL length is 10, then the hash value will be generated using at least 10 characters from the path, such as the first 10 characters. In step 1035, a CRC value is generated for the path based on the URL length from the URL record.

In step 1040, a determination is made whether the hash value generated for the path matches a URL hash value from the URL record. In step 1045, if a determination is made that the hash value generated for the path matches a URL hash value from the URL record, then a determination is made whether the CRC value generated for the path matches a URL CRC value from the URL record. In step 1055, if a determination is made that the CRC value generated for the path matches a URL CRC value from the URL record, then a flags field is processes in step 1060. The flags field may include information for filtering the network traffic that includes the path. The processing of method 1000 then ends in step 1025 of FIG. 10A.

Figure 10C:
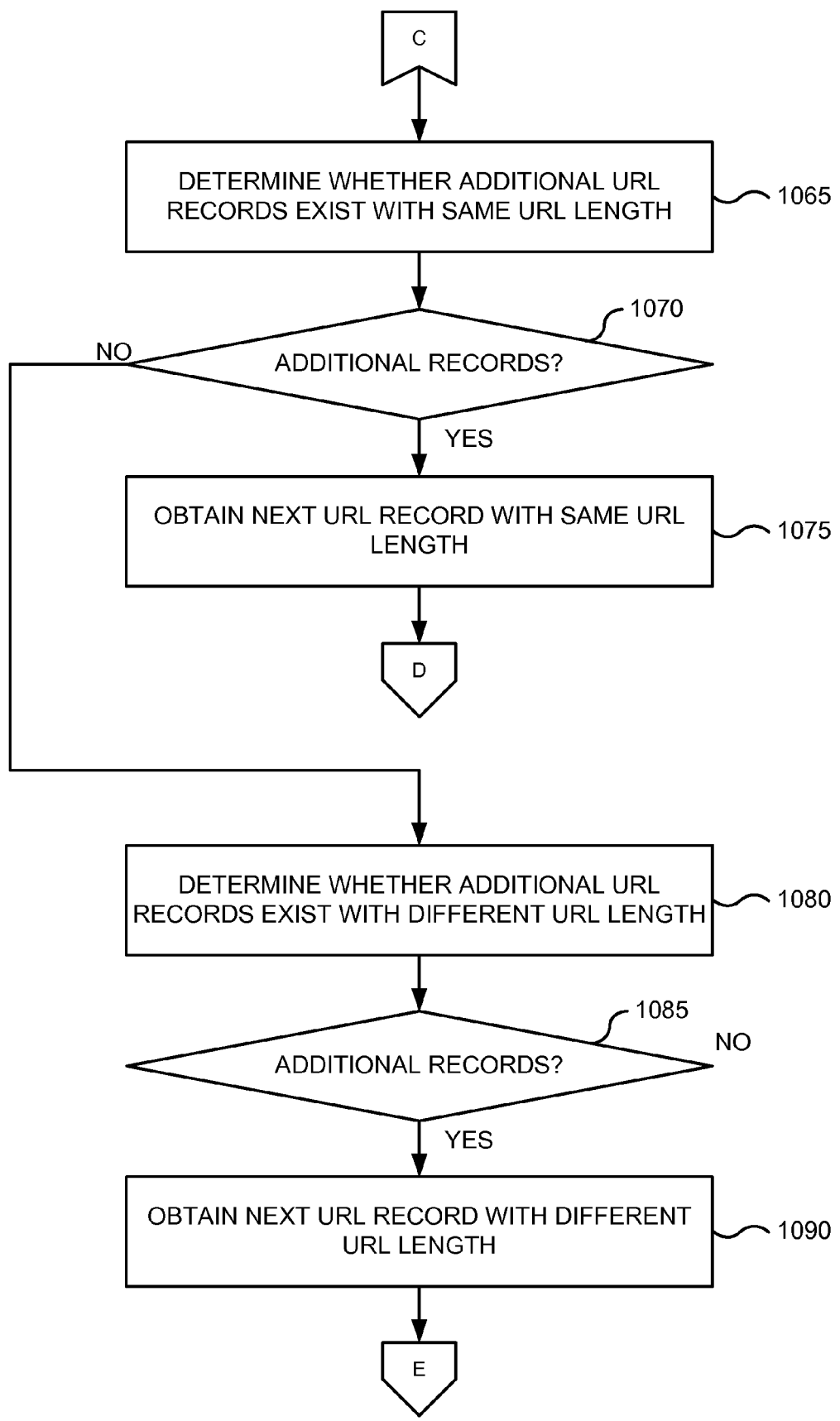

If a determination is made that the hash value generated for the path does not match a URL hash value from the URL record in step 1045 or if a determination is made that the CRC value generated for the path does not match a URL CRC value from the URL record, then the processing of method 1000 continues in step 1065 of FIG. 10C. Referring to FIG. 10C, in step 1065, a determination is made whether additional URL records exist with same URL length. In step 1070, if a determination is made that additional URL records exist with same URL length, then the next record with the same URL length is obtained in step 1075. The processing of method 1000 then continues in step 1040 of FIG. 10B, where further determinations may be made for matches between the path and URL records.

In step 1070, if a determination is made that additional URL records do not exist with same URL length, then a determination is made whether additional URL records exist with different URL lengths in step 1080. In step 1085, if a determination is made that additional URL records do not exist with different URL lengths, then the processing of method 1000 ends in step 1025 of FIG. 10A.

In step 1085, if a determination is made that additional URL records exist with different URL lengths, then the next URL record with a different URL length is obtained in step 1090. The processing of method 1000 then continues in step 1015 of FIG. 10A, where the URL length is determined from the URL record. In various embodiments, URL records may be sorted in ascending order by URL length. Accordingly, generating the hash value or CRC value for the path based on the URL length may include adding the additional characters to the hashing function representing the difference between a prior URL length and the current URL length.

Figure 11:
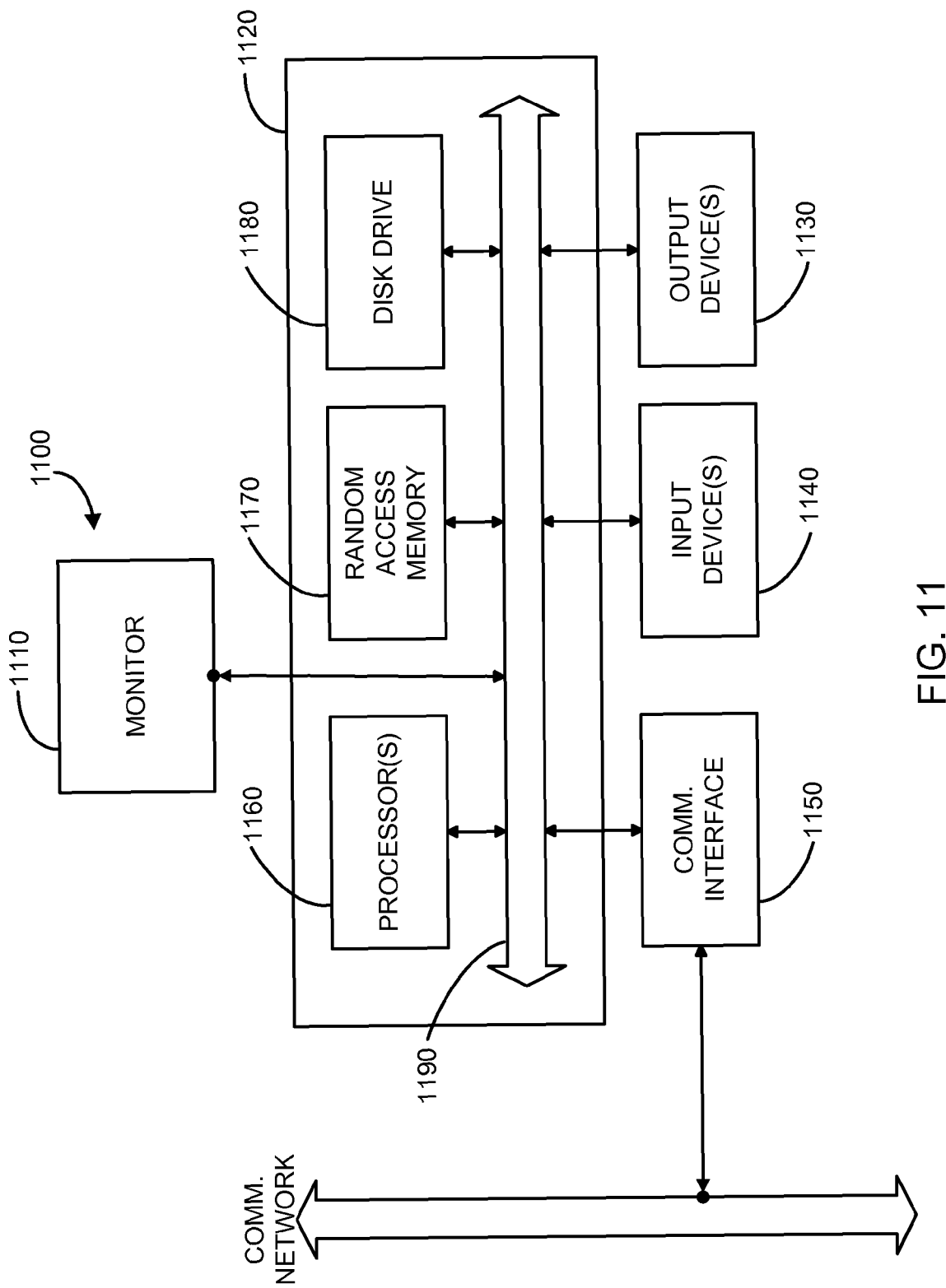
FIG. 11 is a simplified block diagram of a computer system that may incorporate embodiments of the present invention.

FIG. 11 is a simplified block diagram of computer system 1100 that may incorporate embodiments of the present invention. FIG. 11 is merely illustrative of an embodiment incorporating the present invention and does not limit the scope of the invention as recited in the claims. One of ordinary skill in the art would recognize other variations, modifications, and alternatives.

In one embodiment, computer system 1100 typically includes a monitor 1110, a computer 1120, user output devices 1130, user input devices 1140, communications interface 1150, and the like.

As shown in FIG. 11, computer 1120 may include a processor(s) 1160 that communicates with a number of peripheral devices via a bus subsystem 1190. These peripheral devices may include user output devices 1130, user input devices 1140, communications interface 1150, and a storage subsystem, such as random access memory (RAM) 1170 and disk drive 1180.

User input devices 1130 include all possible types of devices and mechanisms for inputting information to computer system 1120. These may include a keyboard, a keypad, a touch screen incorporated into the display, audio input devices such as voice recognition systems, microphones, and other types of input devices. In various embodiments, user input devices 1130 are typically embodied as a computer mouse, a trackball, a track pad, a joystick, wireless remote, drawing tablet, voice command system, eye tracking system, and the like. User input devices 1130 typically allow a user to select objects, icons, text and the like that appear on the monitor 1110 via a command such as a click of a button or the like.

User output devices 1140 include all possible types of devices and mechanisms for outputting information from computer 1120. These may include a display (e.g., monitor 1110), non-visual displays such as audio output devices, etc.

Communications interface 1150 provides an interface to other communication networks and devices. Communications interface 1150 may serve as an interface for receiving data from and transmitting data to other systems. Embodiments of communications interface 1150 typically include an Ethernet card, a modem (telephone, satellite, cable, ISDN), (asynchronous) digital subscriber line (DSL) unit, FireWire interface, USB interface, and the like. For example, communications interface 1150 may be coupled to a computer network, to a FireWire bus, or the like. In other embodiments, communications interfaces 1150 may be physically integrated on the motherboard of computer 1120, and may be a software program, such as soft DSL, or the like.

In various embodiments, computer system 1100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiment, computer 1120 includes one or more Xeon microprocessors from Intel as processor(s) 1160. Further, one embodiment, computer 1120 includes a UNIX-based operating system.

RAM 1170 and disk drive 1180 are examples of tangible media configured to store data such as embodiments of the present invention, including executable computer code, human readable code, or the like. Other types of tangible media include floppy disks, removable hard disks, optical storage media such as CD-ROMS, DVDs and bar codes, semiconductor memories such as flash memories, read-only-memories (ROMS), battery-backed volatile memories, networked storage devices, and the like. RAM 1170 and disk drive 1180 may be configured to store the basic programming and data constructs that provide the functionality of the present invention.

Software code modules and instructions that provide the functionality of the present invention may be stored in RAM 1170 and disk drive 1180. These software modules may be executed by processor(s) 1160. RAM 1170 and disk drive 1180 may also provide a repository for storing data used in accordance with the present invention.

RAM 1170 and disk drive 1180 may include a number of memories including a main random access memory (RAM) for storage of instructions and data during program execution and a read only memory (ROM) in which fixed instructions are stored. RAM 1170 and disk drive 1180 may include a file storage subsystem providing persistent (non-volatile) storage for program and data files. RAM 1170 and disk drive 1180 may also include removable storage systems, such as removable flash memory.

Bus subsystem 1190 provides a mechanism for letting the various components and subsystems of computer 1120 communicate with each other as intended. Although bus subsystem 1190 is shown schematically as a single bus, alternative embodiments of the bus subsystem may utilize multiple busses.

FIG. 11 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for managing network traffic, the method comprising:

determining, with one or more processors associated with one or more computer systems, a URL associated with network traffic received at the one or more computer systems;

generating, with the one or more processors associated with the one or more computer systems, a first hash value for a portion of the URL with a first predetermined hash generation technique;

determining, with the one or more processors associated with the one or more computer systems, that a record exists for the portion of the URL in a first table in a storage device associated with the one or more computer systems represented by a sparse array using the first hash value for the portion of the URL as an index into the first table;

determining, with the one or more processors associated with the one or more computer systems, a location in a second table in the storage device associated with the one or more computer systems at which to search for any records that exist for the portion of the URL based on the record determined to exists for the portion of the URL in the first table;

searching, with the one or more processors associated with the one or more computer systems, a subset of records in the second table at the determined location to determine whether any record exists for the portion of the URL in the second table using the first hash value for the portion of the URL and a second hash value generated for the portion of the URL with a second predetermined hash generation technique, the second predetermined hash generation technique being different than the first predetermined hash generation technique;

determining, with the one or more processors associated with the one or more computer systems, that a record exists for the portion of the URL in the second table in the storage device associated with the one or more computer systems using the second hash value for the portion of the URL;

determining, with the one or more processors associated with the one or more computer systems, a policy for the URL based on a first value of a record for the portion of the URL in the second table;

configuring, with the one or more processors associated with the one or more computer systems, at least one networking device based on whether an originator of the network traffic received at the one or more computer systems is permitted to access the URL according to the determined policy;

sorting records in the second table based on a length of a hostname of a URL corresponding to each record;

generating the second hash value based on the length of a hostname of a URL corresponding to at least one record in the second table identified using the first hash value; and searching a subset of records in the second table stored with the same length to determine whether any record exists for the portion of the URL in the second table using the second hash value for the portion of the URL.

2. The method of claim 1 wherein generating the first hash value or the second hash value for the portion of the URL comprises generating the first hash value or the second hash value for a domain name associated with the URL.

3. The method of claim 2 wherein configuring the at least one networking device based on whether the originator of the network traffic is permitted to access the URL according to the determined policy comprises configuring the at least one network device to block the network traffic based on the domain name.

4. The method of claim 1 wherein generating the first hash value or the second hash value for the portion of the URL comprises generating the first hash value or the second hash value for a hostname associated with the URL.

5. The method of claim 4 wherein configuring the at least one networking device based on whether the originator of the network traffic is permitted to access the URL according to the determined policy comprises configuring the at least one 4 network device to block the network traffic based on the hostname.

6. The method of claim 1 wherein generating the first hash value or the second hash value for the portion of the URL comprises generating the first hash value or the second hash value for a path associated with the URL.

7. The method of claim 6 configuring the at least one networking device based on whether the originator of the network traffic is permitted to access the URL according to the determined policy comprises configuring the at least one network device to block the network traffic based on the path associated with the URL.

8. The method of claim 1 further comprising:
sorting records in the second table based on a length of a path of a URL corresponding to each record;
generating the second hash value based on the length of a path of a URL corresponding to at least one record in the second table identified using the first hash value; and
searching a subset of records in the second table stored with the same length to determine whether any record exists for the portion of the URL in the second table using the second hash value for the portion of the URL.

9. A non-transitory computer-readable medium storing computer-executable code for managing network traffic, the computer-readable medium comprising:

code for determining a URL associated with the network traffic;

code for generating a first hash value for a portion of the URL with a first predetermined hash generation technique;

code for determining that a record exists for the portion of the URL in a first table represented by a sparse array using the first hash value for the portion of the URL as an index into the first table;

code for determining a location in a second table in the storage device associated with the one or more computer systems at which to search for any records that exist for the portion of the URL based on the record determined to exists for the portion of the URL in the first table;

code for searching a subset of records in the second table at the determined location to determine whether any record exists for the portion of the URL in the second table using the first hash value for the portion of the URL and a second hash value generated for the portion of the URL with a second predetermined hash generation technique, the second predetermined hash generation technique being different than the first predetermined hash generation technique;

code for determining that a record exists for the portion of the URL in the second table using the second hash value for the portion of the URL;

code for determining a policy indicative of whether an originator of the network traffic is permitted to access the URL based on a value of a record for the portion of the URL in the second table;

code for configuring one or more networking devices based on the determined policy;

code for sorting records in the second table based on a length of a hostname of a URL corresponding to each record;

code for generating the second hash value based on the length of a hostname of a URL corresponding to at least one record in the second table identified using the first hash value; and code for searching a subset of records in the second table stored with the same length to determine whether any record exists for the portion of the URL in the second table using the second hash value for the portion of the URL.

10. The non-transitory computer-readable medium of claim 9 wherein the code for generating the first hash value or the second hash value for the portion of the URL comprises code for generating the first hash value or the second hash value for a domain name associated with the URL.

11. The non-transitory computer-readable medium of claim 10 wherein the code for configuring the one or more networking devices based on the determined policy comprises code for blocking the network traffic based on the domain name.

12. The non-transitory computer-readable medium of claim 9 wherein the code for generating the first hash value or the second hash value for the portion of the URL comprises code for generating the first hash value or the second hash value for a hostname associated with the URL.

13. The non-transitory computer-readable medium of claim 12 wherein the code for configuring the one or more networking devices based on the determined policy comprises code for blocking the network traffic based on the hostname.

14. The non-transitory computer-readable medium of claim 9 wherein the code for generating the first hash value or the second hash value for the portion of the URL comprises code for generating the first hash value or the second hash value for a path associated with the URL.

15. The non-transitory computer-readable medium of claim 14 wherein the code for configuring the one or more networking devices based on the determined policy comprises code for blocking the network traffic based on the path associated with the 4 URL.

16. The non-transitory computer-readable medium of claim 9 further comprising:
- code for sorting records in the second table based on a length of a path of a URL corresponding to each record;
- code for generating the second hash value based on the length of a path of a URL corresponding to at least one record in the second table identified using the first hash value; and
- code for searching a subset of records in the second table stored with the same length to determine whether any record exists for the portion of the URL in the second table using the second hash value for the portion of the URL.

17. A network appliance for managing network traffic, the network appliance comprising:
- a communications interface configured to receive network traffic associated with a communications network;
- a storage device configured to store a first table and a second table, the first table represented by a sparse array; and
- a processor in communication with the communications interface and the storage device and configured to:
  - determine a URL associated with the network traffic;
  - generate a first hash value for a portion of the URL with a first predetermined hash generation technique;
  - determine that a record exists for the portion of the URL in the first table using the first hash value for the portion of the URL as an index into the first table;
  - determine a location in the second table at which to search for any records that exist for the portion of the URL based on the record determined to exists for the portion of the URL in the first table;
  - search a subset of records in the second table at the determined location to determine whether any record exists for the portion of the URL in the second table using the first hash value for the portion of the URL and a second hash value generated for the portion of the URL with a second predetermined hash generation technique, the second predetermined hash generation technique being different than the first predetermined hash generation technique;
  - determine that a record exists for the portion of the URL in the second table using the second hash value for the portion of the URL;
  - determine a policy indicative of whether an originator of the network traffic is permitted to access the URL based on a value of a record for the portion of the URL in the second table;
  - configure one or more networking devices based on the determined policy;
  - sort records in the second table based on a length of a hostname of a URL corresponding to each record;
  - generate the second hash value based on the length of a hostname of a URL corresponding to at least one record in the second table identified using the first hash value; and
  - search a subset of records in the second table stored with the same length to determine whether any record exists for the portion of the URL in the second table using the second hash value for the portion of the URL.

18. The network appliance of claim 17 wherein the processor is configured to generate the first hash value or the second hash value for a domain name associated with the URL.

19. The network appliance of claim 17 wherein the processor is configured to generate the first hash value or the second hash value for a hostname associated with the URL.

20. The network appliance of claim 17 wherein the processor is configured to generate the first hash value or the second hash value for a path associated with the URL.

21. The network appliance of claim 17 wherein the processor is further configured to:
- sort records in the second table based on a length of a path of a URL corresponding to each record;
- generate the second hash value based on the length of a path of a URL corresponding to at least one record in the second table identified using the first hash value; and
- search a subset of records in the second table stored with the same length to determine whether any record exists for the portion of the URL in the second table using the second hash value for the portion of the URL.

* * * * *